March 1, 1927.　　　W. J. PARKS ET AL　　　1,619,536
DIRECTION INDICATOR
Filed March 12, 1923
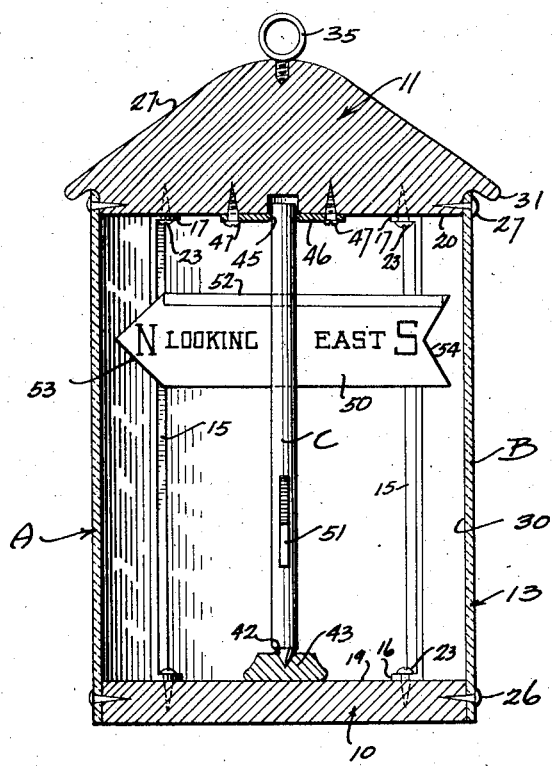
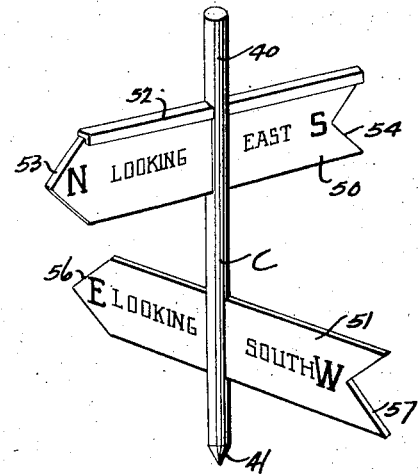
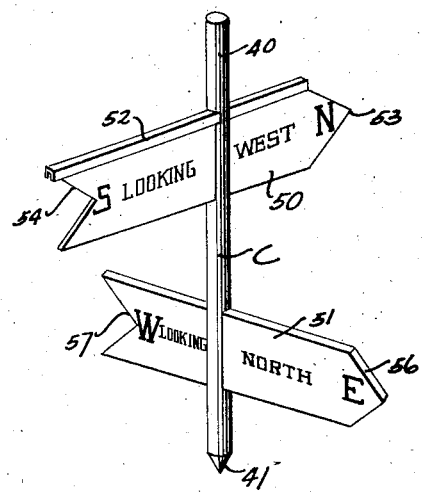
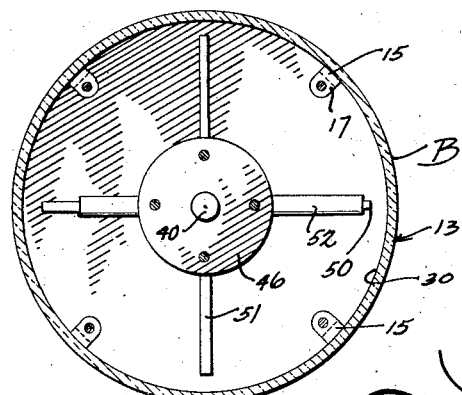
Inventors
William J. Parks.
Lincoln B. Evans.

Patented Mar. 1, 1927.

1,619,536

UNITED STATES PATENT OFFICE.

WILLIAM J. PARKS AND LINCOLN B. EVANS, OF LA SALLE, ILLINOIS.

DIRECTION INDICATOR.

Application filed March 12, 1923. Serial No. 624,516.

This invention relates to direction indicating mechanisms.

The primary object of this invention is the provision of a direction indicator particularly well adapted for use upon automotive vehicles, aircraft, or vessels, to determine in convenient and accurate manner the direction of travel.

A further object of this invention is the provision of direction indicating apparatus which is particularly well adapted for use upon automotive vehicles embodying direction indicating mechanism responsive to polar magnetism.

A further object of this invention is the provision of direction indicating mechanism of the above mentioned character, including novel details of construction which render the same practical as an instrument for universal use.

Other objects and advantages of this invention will be apparent during the course of the following detailed description.

In the accompanying drawing, forming a part of this specification, and wherein similar reference characters designate corresponding parts throughout the several views, Figure 1 is a vertical cross sectional view, taken through the improved direction indicating apparatus, showing novel cooperating details thereof.

Figure 2 is a cross sectional view, taken through the improved apparatus showing cooperating parts thereof.

Figures 3 and 4 are perspective views of direction indicating means embodied in the improved apparatus, which are responsive to earthly magnetism and show more particularly a novel arrangement of direction indicating indicia.

In the drawing, wherein for the purpose of illustration is shown but the preferred embodiment of this invention. the letter A generally designates the improved device, which may include a housing B; and movable direction indicating means C.

Referring to the housing B, the same preferably includes a disc shaped supporting base 10 of any approved material; a cap 11 of bell or conical formation; and a side wall construction 13. The bottom and top pieces 10 and 11 may be of metal, wood, or any approved material, being connected in spaced relation by means of rigid bars 15, the ends 16 and 17 of which are offset onto the top and bottom surfaces 19 and 20 respectively of the bottom and top members 10 and 11; and to which surfaces said offsets 16 and 17 are secured, as by means of screws 23 or the like. In this manner, the top and bottom pieces 10 and 11 are held in accurately spaced relation. The well portion 13 of the housing B preferably includes a cylindrical shaped piece of transparent material, such as glass, isinglass, or the like, which at its lower end receives the base or bottom member 10 therein, and is secured thereto as by means of securing elements 26. The upper end of the cylindrical transparent member 13 receives the lower end of the bell shaped top 11 therein, being secured thereto as by nails or analogous securing elements 27. It is to be noted that the top member 11 extends upwardly above the side wall cylinder 13, providing an inclined top surface 27 over which moisture or any other settling material may pass, so that the same may not reach the compartment 30 within the housing B. To this end the top member 11 is provided with the annular drip flange 31, which extends laterally outwardly of the top marginal edge of the cylinder shaped transparent member 13, substantially as is illustrated in Figure 1 of the drawing. At the extreme top of the member 11, a supporting hook or ring 35 may be provided, for suspending the mechanism A so that the same may hang vertically at all times. In lieu of the supporting ring 35, it is contemplated that the device A may be mounted on the hoods of vehicles, or otherwise disposed for convenient reading.

Referring to the means C, the same preferably includes a supporting shaft or pin 40, pointed at its lower end 41 for bearing within a cone shaped aperture 42 of a step bearing 43 mounted interiorly of the compartment 30 upon the base 10. The upper end of the shaft or pin 40 bears within an aperture 45 of a bearing washer 46, which may be attached as by screw elements 47 to the under surface 20 of the housing top 11. In this manner the shaft 40 is axially supported for rotation within the compartment 30 of housing B. Substantially arrow shaped members 50 and 51 are transversely carried by the pin or shaft 40 in any approved manner; said members 50 and 51 being preferably arranged at right angles to each other and being of non-magnetic material. It is preferred to provide a channel shaped magnetized bar or needle 52, resting or secured over the top edge of the member 50; this needle 52 being responsive to polar magnetism so that the same will normally maintain the arrow shaped member 50 pointed north and south, while of course the member 51 points east and west.

A novel indicia arrangement is provided upon the members 50 and 51. It is preferred that the letters N and S be provided adjacent the head and tail ends 53 and 54 respectively of the arrow or member 50 upon both sides thereof. One side of this member 50 has "Looking east" delineated thereon, while the other side has "Looking west" delineated thereon. As to the member 50, the letters "E" and "W" are preferably delineated upon both sides thereof adjacent the head and tail ends 56 and 57 respectively thereof. On one side of the member 50, the words "Looking south" are delineated thereon, while the other side has the words "Looking north" delineated thereon.

The operation of the improved direction indicator A is obvious. It will at once inform the driver of a vehicle or the craft to which the same is attached in which direction the same is being propelled. The fact that the members 50 and 51 are relatively large permits the indicia thereon to be correspondingly large and easy to read. It is contemplated to delineate the indicia upon the members 50 and 51 by means of some luminous paste, or outline the same with luminous material, so that the same may be readily observed at night, as well as by day. This idea also contemplates the outlining of the arrow along its marginal edges.

The principle of this invention may be used for traffic direction, as at cross roads or cross streets.

Various changes in the shape, size and arrangement of parts may be made to the form of the invention herein shown and described, without departing from the spirit of the invention or the scope of the claims.

We claim:

1. As an article of manufacture, a housing for direction indicating mechanisms including a disc shaped supporting base, a conical shaped top being provided with a downwardly tapered top surface, means supporting said base and top in spaced relation, transparent side walls extending intermediate said base and top and providing an enclosed compartment, said top having an annular drip flange extending outwardly and over the marginal top of said side walls, and magnetized direction indicating means movable in the housing and visible through said side walls.

2. In an automobile direction indicator the combination of a supporting base, a top member, a transparent side wall structure supported between the base and top member, a vertically disposed shaft pivotally mounted in enclosed relation in the transparent side wall structure, a pair of flat horizontally elongated direction indicating members mounted in vertical planes at right angles to each other on said pivotally mounted shaft, said members each having their opposite sides thereof provided with indicia designating the direction in which an observer of the same is looking and indicia designating the direction in which the members are pointed, and a magnetized bar construction fixed with respect to said rotatable shaft.

3. In a direction indicator mechanism of the class described the combination of a housing including a transparent wall, a shaft rotatably carried within said housing, substantially flat direction indicating members transversely fixed upon said shaft having direction indicating indicia thereon, and a substantially channel-shaped magnetic bar carried at the upper edge of one of said direction indicating members.

4. In a direction indicator of the class described the combination of a disc shaped base, a top member having a downwardly sloping wall, rigid bars vertically arranged between the facing surfaces of said base and top member, said bars having the ends thereof flanged in right angular manner and overlying the facing surfaces of the base and top member and attached to said surfaces, a transparent cylindrical shaped side wall structure attached to the outer periphery of said base and the lower portion of said top member and enclosing said rigid supporting bars therein, a rotatable shaft, means pivotally mounting the rotatable shaft on a vertical axis between said base and top member, flat arrow shaped indicator members carried in vertical planes in right angular relation by said rotatable shaft and having direction indicating delineations thereon, and a substantially channel shaped magnetic bar carried by one of said arrow shaped indicator members.

5. A direction indicator comprising a housing including a disc-shaped base, a substantially conical shaped top having its apex uppermost, vertical bars supporting the base and top in spaced stable relation, a cylindrical shaped transparent side wall construction receiving said base and lower portion of the top therein so that the interior of the housing is visible exteriorly thereof, said top being provided with an annular drip flange overhanging the top of said cylindrical side wall construction, a shaft having a conical pointed lower end, a step bearing within the housing compartment supported by the base for the conical pointed end of said shaft, a bearing ring supported by the top within said compartment for rotatably receiving the upper end of said shaft, substantially arrow indicating members horizontally supported in transverse right angled relation upon said shaft and said arrows being relatively arranged at right angles with respect to each other, and a channel shaped magnetized bar supported by one of said members, responsive to magnetism, said indicator members having direction indicia thereon.

WILLIAM J. PARKS.
LINCOLN B. EVANS.